United States Patent
Kim et al.

(10) Patent No.: US 8,265,155 B2
(45) Date of Patent: Sep. 11, 2012

(54) METHOD OF BLOCK PARTITION FOR H.264 INTER PREDICTION

(75) Inventors: Ig Kyun Kim, Daejeon (KR); Kyoung Seon Shin, Daejeon (KR); Seong Mo Park, Daejeon (KR); Nak Woong Eum, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 412 days.

(21) Appl. No.: 12/565,949

(22) Filed: Sep. 24, 2009

(65) Prior Publication Data

US 2010/0172414 A1  Jul. 8, 2010

Related U.S. Application Data

(60) Provisional application No. 61/142,594, filed on Jan. 5, 2009.

(51) Int. Cl.
*H04N 7/12* (2006.01)
(52) U.S. Cl. .................................................. 375/240.15
(58) Field of Classification Search ........................ None
See application file for complete search history.

(56) References Cited

U.S. PATENT DOCUMENTS

| | | | | |
|---|---|---|---|---|
| 6,014,181 | A * | 1/2000 | Sun | 348/699 |
| 7,526,028 | B2 * | 4/2009 | Sung et al. | 375/240.16 |
| 7,720,154 | B2 * | 5/2010 | Zhou et al. | 375/240.16 |
| 2003/0118101 | A1 * | 6/2003 | Dinerstein | 375/240.12 |
| 2006/0039470 | A1 | 2/2006 | Kim et al. | |
| 2007/0140336 | A1 * | 6/2007 | Karube et al. | 375/240.08 |
| 2007/0171974 | A1 * | 7/2007 | Baik | 375/240.12 |
| 2008/0123904 | A1 * | 5/2008 | Sakamoto et al. | 382/107 |
| 2008/0130755 | A1 * | 6/2008 | Loukas et al. | 375/240.24 |
| 2008/0317132 | A1 * | 12/2008 | Zhou et al. | 375/240.16 |
| 2009/0245374 | A1 * | 10/2009 | Hsu et al. | 375/240.16 |

FOREIGN PATENT DOCUMENTS

| | | | |
|---|---|---|---|
| KR | 20040093604 | A | 11/2004 |
| KR | 20040093605 | A | 11/2004 |
| KR | 20050061762 | A | 6/2005 |
| KR | 10-2007-0084686 | A | 8/2007 |

OTHER PUBLICATIONS

Mei-Juan Chen et al., "Fast Variable Block-Size Motion Estimation by Merging Refined Motion Vector for H.264", IEICE TRANS. COMMUN., Oct. 10, 2006, pp. 2922-2928, vol. E89-B, No. 10.

* cited by examiner

*Primary Examiner* — Michael J Moore, Jr
(74) *Attorney, Agent, or Firm* — Rabin & Berdo, P.C.

(57) ABSTRACT

Provided is a method for partitioning a block in inter prediction including selecting one standard reference frame from at least one reference frame which is a comparison target in inter prediction, searching whether or not a higher-level macroblock of a current frame is partitioned based on the selected standard reference frame, determining a partition size of the higher-level macroblock of the current frame, searching whether or not the higher-level macroblock in which the partition size is determined is partitioned by comparing with any certain reference frame other than the standard reference frame, and stopping a block size search on the higher-level macroblock of the current frame if a partition size of the higher-level macroblock of the current frame determined by comparing with the standard reference frame and a partition size of the higher-level macroblock of the current frame determined by comparing with the certain reference frame are different from each other.

9 Claims, 6 Drawing Sheets

METHOD OF BLOCK PARTITION FOR H.264 INTER PREDICTION

BACKGROUND

1. Field of the Invention

The present invention relates to a method and apparatus for partitioning a block for motion compensation in inter prediction in which a block is effectively partitioned using a cost of a ½ block.

2. Discussion of Related Art

H.264/MPEG-4 AVC is a video compression standard which was jointly developed in 2003 by the ITU-T Video Coding Experts Group (VCEG) and the ISO/IEC Moving Picture Experts Group (MPEG). H.264 is 1.5 to 2 times higher in compression rate than MPEG-2 or MPEG-4 but requires a large amount of encoding process. A ratio of the amount of inter prediction process to the whole encoding process is increased due to functions such as variable block size, a maximum of five reference frames, and ¼ pixel motion compensation, which were adopted to increase encoding efficiency.

Many studies have been conducted to effectively perform encoding process, but a study on high speed processing of a function which is newly added to H.264 has not sufficiently been conducted. A technique for effectively selecting a search block size using pixel value differences between a target macroblock to be encoded and a macroblock of a reference frame has been suggested. However, when this technique is applied to searching a plurality of reference frames, a search block size differs among the reference frames, and it is less likely to partition a block into two blocks either vertically or horizontally when selecting a search block size, so that the encoding rate deteriorates.

Figure 1:
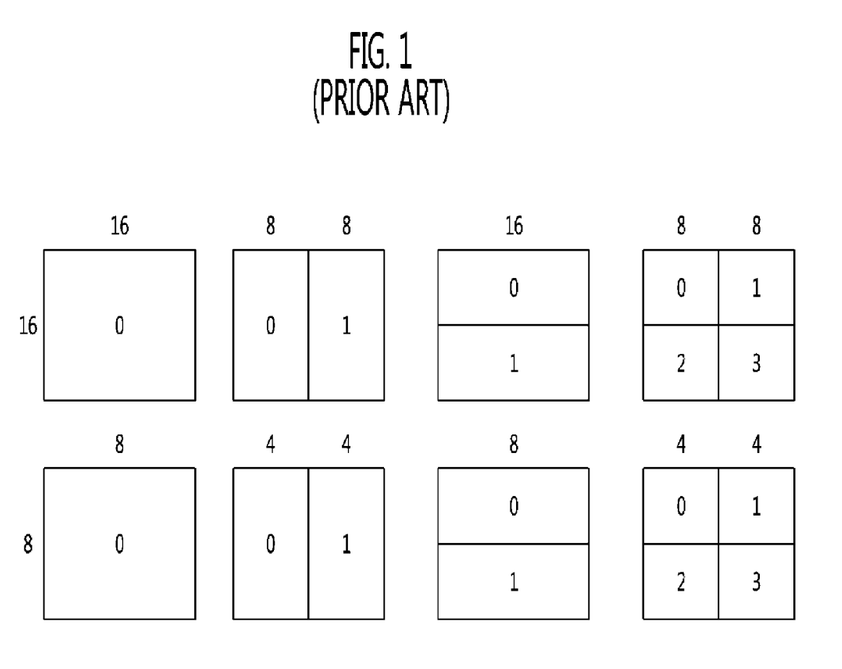
FIG. 1 shows block partitions used in H.264 inter prediction scheme.

FIG. 1 shows block partitions used in H.264 inter prediction scheme.

Referring to FIG. 1, in H.264 inter prediction scheme, a total of 7 block sizes of from 16×16 to 4×4 can be used. Since various block sizes can be used, prediction can be performed by flexibly changing a block size with respect to portions that are quite different from a reference frame and portions that are similar to the reference frame, so that difference values between frames can be reduced. Also, although the computation amount may be increased by referring many frames, the amount of encoded data is reduced, so that compression efficiency is more improved.

However, since determination of a block partition size in a frame requires a long process time and a large amount of process, there is a need for a method for effectively partitioning a block.

SUMMARY OF THE INVENTION

The present invention is directed to a method and apparatus for partitioning a block in inter prediction.

The present invention is also directed to a method and apparatus for partitioning a block in which the computation amount is reduced when a block is partitioned in inter prediction.

One aspect of the present invention provides a method for partitioning a block in inter prediction, comprising: selecting one standard reference frame from at least one reference frame which is a comparison target in inter prediction; searching whether or not a higher-level macroblock of a current frame is partitioned based on the selected standard reference frame; determining a partition size of the higher-level macroblock of the current frame; searching whether or not the higher-level macroblock in which the partition size is determined is partitioned by comparing with any certain reference frame other than the standard reference frame; and stopping a block size search on the higher-level macroblock of the current frame if a partition size of the higher-level macroblock of the current frame determined by comparing with the standard reference frame and a partition size of the higher-level macroblock of the current frame determined by comparing with the certain reference frame are different from each other.

Searching whether or not the higher-level macroblock of the current frame is partitioned may comprise measuring a minimum cost of the higher-level macroblock of the current frame, measuring a minimum cost of a ½ block included in the higher-level macroblock of the current frame, comparing the minimum cost of the ½ block and the minimum cost of the higher-level macroblock and searching the macroblock of the current frame using the ½ block if the minimum cost of the ½ block is smaller than the minimum cost of the higher-level macroblock.

The method for partitioning a block in inter prediction may further comprise comparing the minimum cost of the ½ block and the minimum cost of the higher-level macroblock and comparing motion vector locations of sub-blocks in which the higher-level macroblock is partitioned into four if the minimum cost of the ½ block is larger than the minimum cost of the higher-level macroblock, stopping partitioning of the higher-level macroblock of the current frame if four motion vector locations are adjacent to each other, searching the higher-level macroblock of the current frame using the ½ block and the ¼ block if three motion vector locations are adjacent to each other, searching the higher-level macroblock of the current frame using the ½ block if three motion vector locations are adjacent to each other; and searching the higher-level macroblock of the current frame using the ¼ block if there are no motion vector locations which are adjacent to each other.

The higher-level macroblock of the current frame may be either a 16×16 macroblock or an 8×8 sub-macroblock.

At most 16 frames may be used as the reference frame.

A partition size of the higher-level macroblock of the current frame may be one of 16×8, 8×16 and 8×8 when a block size of the higher-level macroblock is 16×16, and a partition size of the higher-level macroblock of the current frame may be one of 8×4, 4×8 and 4×4 when a block size of the higher-level macroblock is 8×8.

The method for partitioning a block in inter prediction may further comprise partitioning the higher-level macroblock of the current frame using the partition size if the partition size of the higher-level macroblock of the current frame determined by comparing with the standard reference frame and the partition size of the higher-level macroblock of the current frame determined by comparing with the certain reference frame are equal to each other.

The sub-block may have a ¼ size of the higher-level macroblock of the current frame, and the ½ block may have a ½ size of the higher-level macroblock of the current frame.

The motion vector may be a point of a sub-macroblock in which a cost value obtained by adding a Sum of Absolute Differences (SAD) and a motion vector value is minimum.

Another aspect of the present invention provides an apparatus for partitioning a block in inter prediction, comprising: a first reference frame selecting unit which selects one from at least one reference frame which is a comparison target in inter prediction; a reference frame partition search unit which searches whether or not a higher-level macroblock of a current frame is partitioned based on the reference frame; a first macroblock partition determining unit which determines a partition size of the higher-level macroblock of the current frame based on the reference frame; a second reference frame selecting unit which selects a new reference frame based on the higher-level macroblock in which the partition size is determined; a second macroblock partition determining unit which determines a partition size of the higher-level macroblock of the current frame based on the new reference frame selected by the second reference frame selecting unit; and a final macroblock partition determining unit which determines a partition size of the higher-level macroblock by comparing the partition size determined by the first macroblock partition determining unit and the partition size determined by the second macroblock partition determining unit.

The reference frame partition search unit may comprise a higher-level block measuring unit which measures a cost of the higher-level macroblock of the current frame, a ½ block measuring unit which measures a cost of a ½ block included in the higher-level macroblock of the current frame, a block partition search unit which compares a minimum cost of the ½ block and a minimum cost of the higher-level macroblock and searches the macroblock of the current frame using the ½ block if the minimum cost of the ½ block is smaller.

BRIEF DESCRIPTION OF THE DRAWINGS

The above and other features and advantages of the present invention will become more apparent to those of ordinary skill in the art by describing in detail preferred embodiments thereof with reference to the attached drawings in which.

DETAILED DESCRIPTION OF EXEMPLARY EMBODIMENTS

Hereinafter, exemplary embodiments of the present invention will be described in detail. However, the present invention is not limited to the embodiments disclosed below, but can be implemented in various forms. Therefore, the following embodiments are described in order for this disclosure to be complete and enabling to those of ordinary skill in the art.

Hereinafter, a method and apparatus for partitioning a block in inter prediction according to an exemplary embodiment of the present invention will be described in detail with reference to the accompanying drawings.

Figure 2:
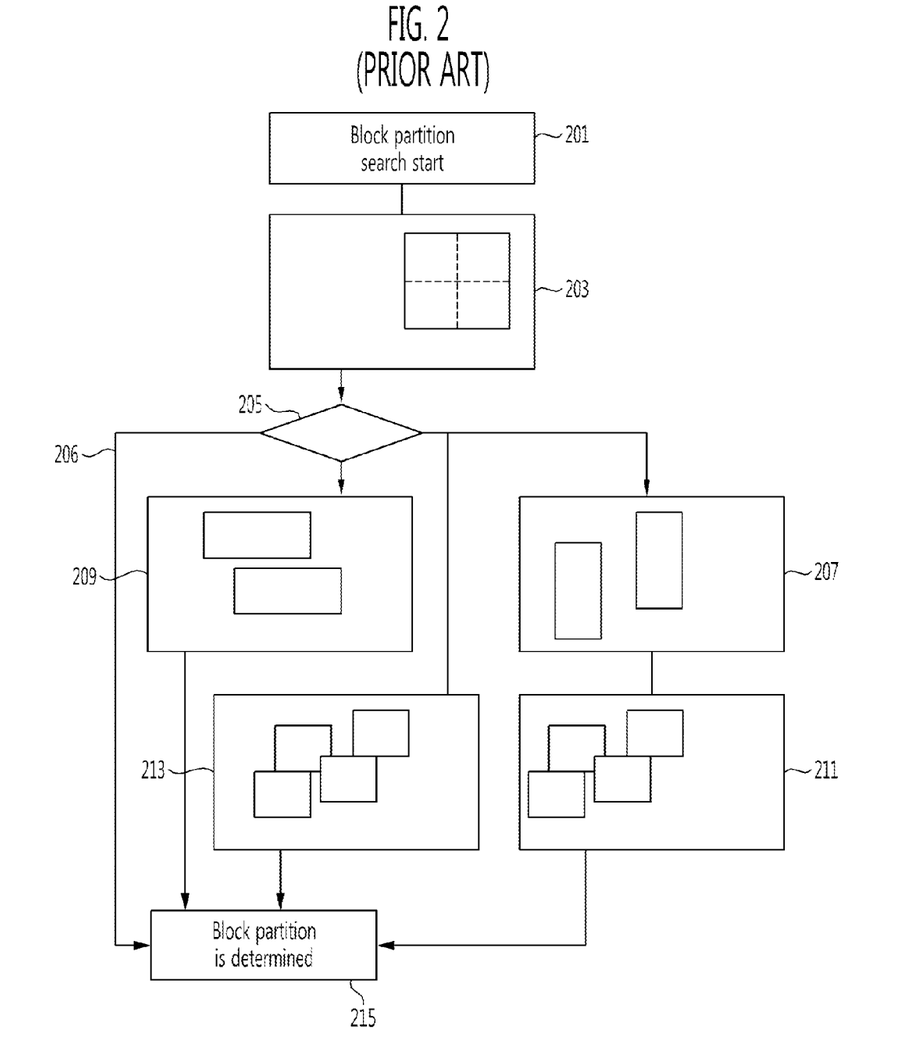
FIG. 2 shows a method for determining a block size in inter prediction according to a conventional art.

FIG. 2 shows a method for determining a block size in inter prediction according to a conventional art.

Referring to FIG. 2, a search on a partition size of a higher-level block starts (step 201). The search on the partition size starts from a 16×16 macroblock as a higher-level block. Alternatively, an 8×8 sub-macroblock can be a higher-level block, since up to 4×4 is supported by H.264 as a minimum block partition size.

When the search on the partition size of the higher-level block starts, after the higher-level block is partitioned into 4 sub-blocks, a sum of absolute differences (SAD) and a cost of a motion vector for each sub-block is obtained. Here, a cost of a block is obtained by adding the SAD value and the cost of the motion vector for the block. A motion vector location value of each sub-block is also obtained. The obtained values are stored in a table in a reference memory (step 203).

After searching at each search point, motion vectors of sub-blocks are compared to each other (step 205). If four motion vector location values are adjacent to each other, that is, if motion vector locations are identical in adjacent form to each other (step 206), block partitioning is stopped (step 215). In this case, there is no longer any need to partition a higher-level block.

If two motion vector values are adjacent to each other regardless of whether partitioning is vertical or horizontal, a size of two blocks partitioned is searched according to an adjacent direction (step 209). On the other hand, if there are no motion vector values which are adjacent to each other, a block size of all of four sub-blocks is searched. If three motion vector values are adjacent to each other, a block size is searched with respect to both a ½ size and a ¼ size (step 211).

Figure 3:
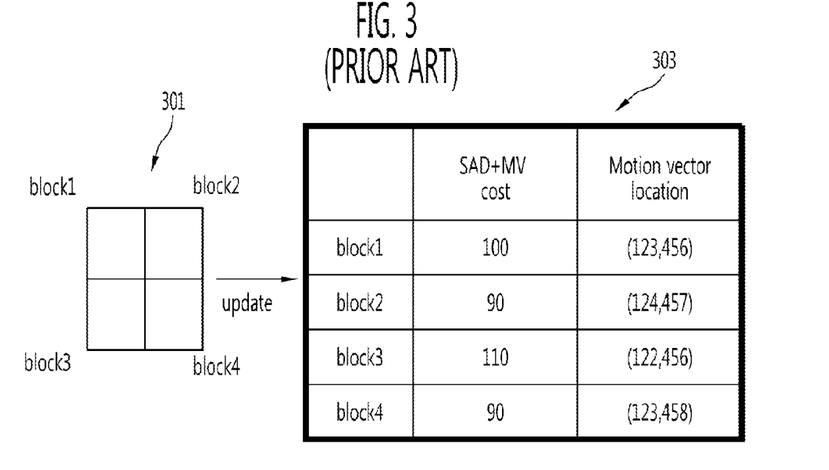
FIG. 3 shows information stored in a reference memory according to a conventional art.

FIG. 3 shows information stored in a reference memory according to a conventional art.

Referring to FIG. 3, in a conventional block partitioning method, as a reference value for a block size search of a higher-level block 301, a value obtained by adding a SAD value and a cost of a motion vector and coordinates representing a motion vector location for each sub-block are stored.

Figure 4:
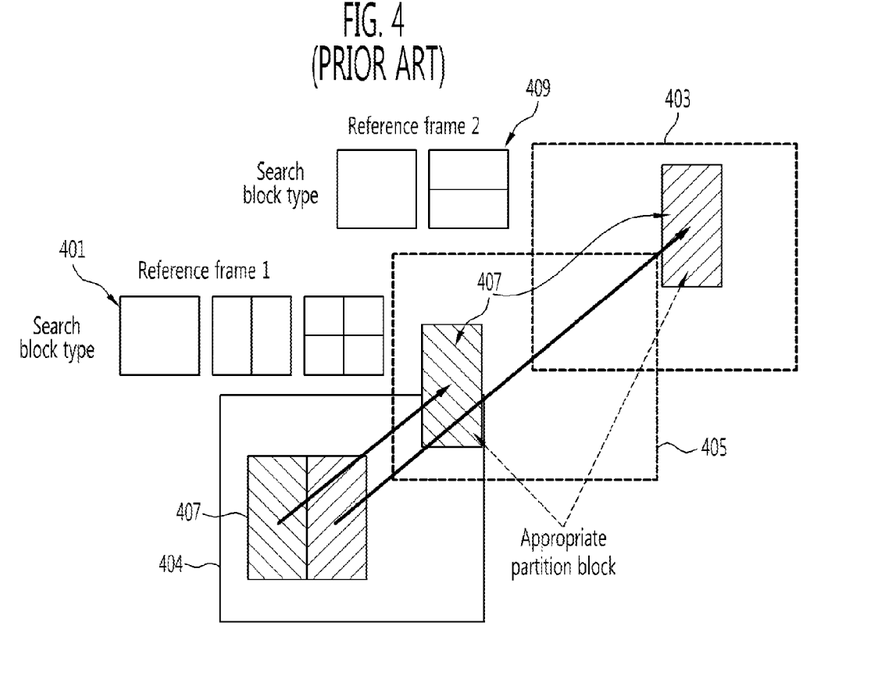
FIG. 4 shows a disadvantage of a conventional block partitioning method.

FIG. 4 shows a disadvantage of a conventional block partitioning method.

Referring to FIG. 4, when a block size of a certain block 407 in a target frame 404 that will be partitioned into blocks is searched, a plurality of reference frames can be used in H.264. However, if it is assumed that block partition is determined as in reference numeral 401 when a first reference frame 405 is used and block partition is determined as in reference numeral 409 when a second reference frame 403 is used, the block partitioning method of the first frame and that of the second frame becomes different. Meanwhile, reference numeral 407 represents the best block partitioning method.

Therefore, in the above-described case, it is difficult to find an optimum block partitioning method since a block partitioning method depends on a reference frame, and thus the computation amount is further increased.

Figure 5:
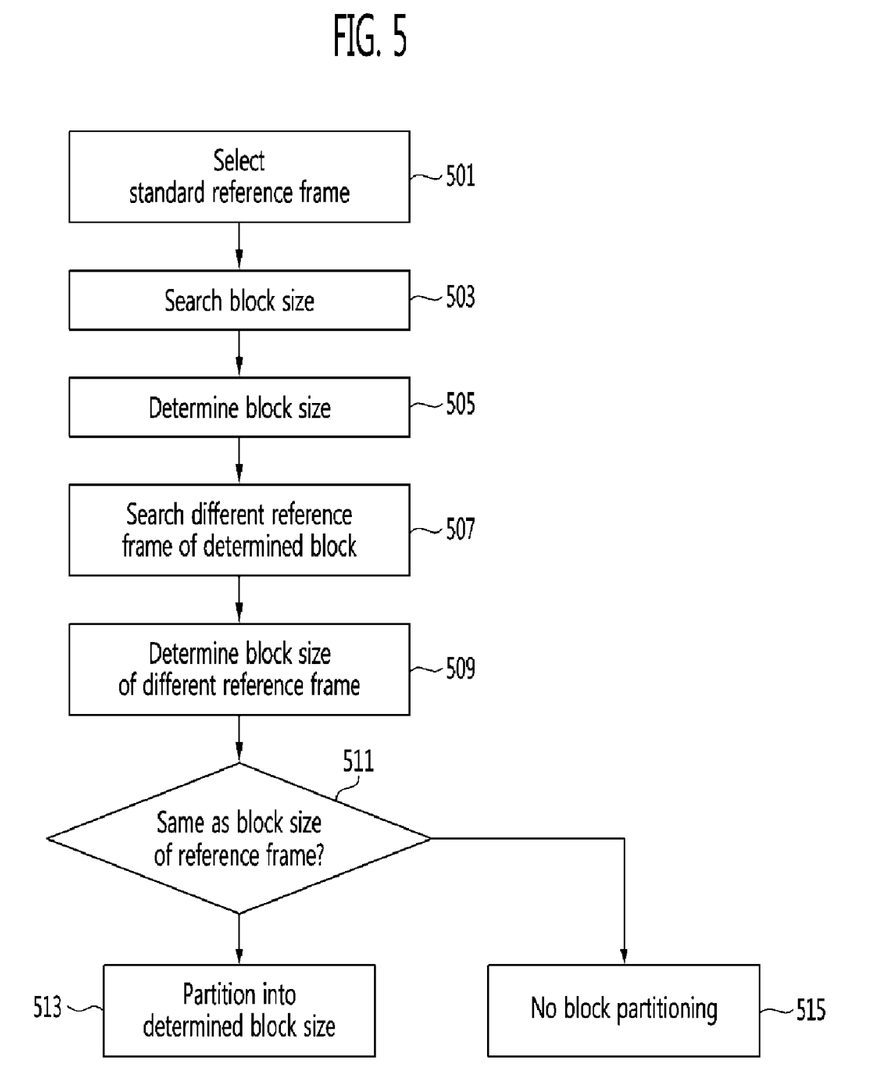
FIG. 5 is a flowchart illustrating a block partitioning method according to an exemplary embodiment of the present invention.

FIG. 5 is a flowchart illustrating a block partitioning method according to an exemplary embodiment of the present invention.

Referring to FIG. 5, a standard reference frame is selected (step 501). Here, a standard reference frame is referred to as "a frame" which is determined and selected as best suitable as a reference frame among many frames.

A block size search is performed using the standard reference frame (step 503). In this block size search step, information of sub-blocks is stored in a way similar to the conventional art, but unlike the conventional art, a cost value of a ½ block is stored together, which will be described later with reference to FIG. 7.

After the block size search, a block size is determined (step 505). The block size search method and the block size determining method will be described later in detail with reference to FIG. 6.

When a block size is determined, a block size of the block in which a block size has been determined is searched again using another frame among the reference frames other than the standard reference frame (step 507).

Therefore, a block size for another reference frame is determined (step 509).

Next, the block size determined by using the standard reference frame and the block size determined by using another reference frame is compared (step 511). If the block size determined by using the standard reference frame and the block size determined by using another reference frame are the same as each other, block partitioning is performed using the block size (step 513), and if they are not the same, a block is not partitioned using it (step 515).

Here, in the above block partitioning method, a method for searching a block size is very important.

Figure 6:
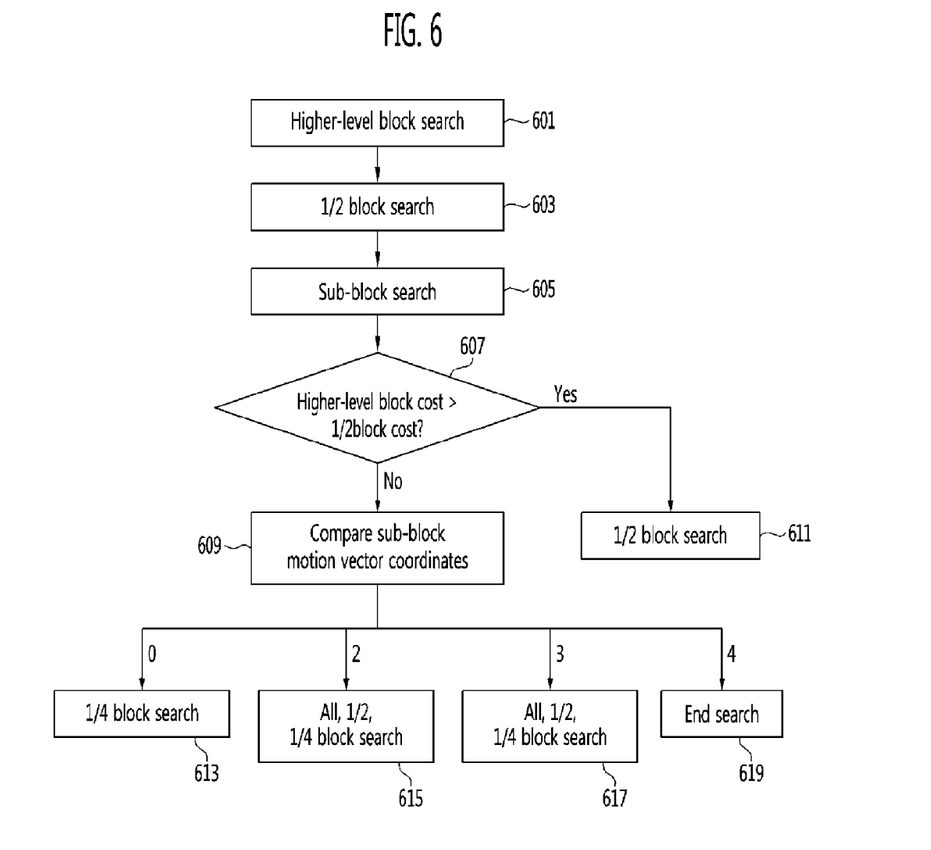
FIG. 6 is a flowchart illustrating a method of searching a block partition size according to an exemplary embodiment of the present invention.

FIG. 6 is a flowchart illustrating a method of searching a block partition size according to an exemplary embodiment of the present invention.

Referring to FIG. 6, a search is performed up to a sub-block size, starting from a higher-level block (16×16) (step 601). Then, a cost of a half-partitioned block of the higher-level block is measured (step 603). A SAD value, a motion vector cost and a motion vector value for each of quarter-partitioned blocks, which are sub-blocks of the higher-level block, is calculated (step 605).

A minimum cost value of the higher-level block SAD and a minimum cost value of the ½ block SAD are compared (step 607). If the minimum cost value of the higher-level block SAD is larger than the minimum cost value of the ½ block, it is determined to search for a block size using the ½ block (step 611).

On the other hand, if the minimum cost value of the higher-level block is smaller than the minimum cost value of the ½ block (16×8, 8×16), motion vector values of the quarter-partitioned (4×4) sub-blocks of the higher-level block (16×16) are compared (step 609).

If two or three motion vector values are equal, it is determined to search for the ½ block, the ¼ block and the higher-level block (16×16) (step 615). If four motion vector values are the same, the higher-level block (16×16) is used, and block partitioning is finished without partitioning (step 619). If there are no motion vectors which are the same as each other, a search is performed using the ¼ block (4×4) (step 613).

Figure 7:
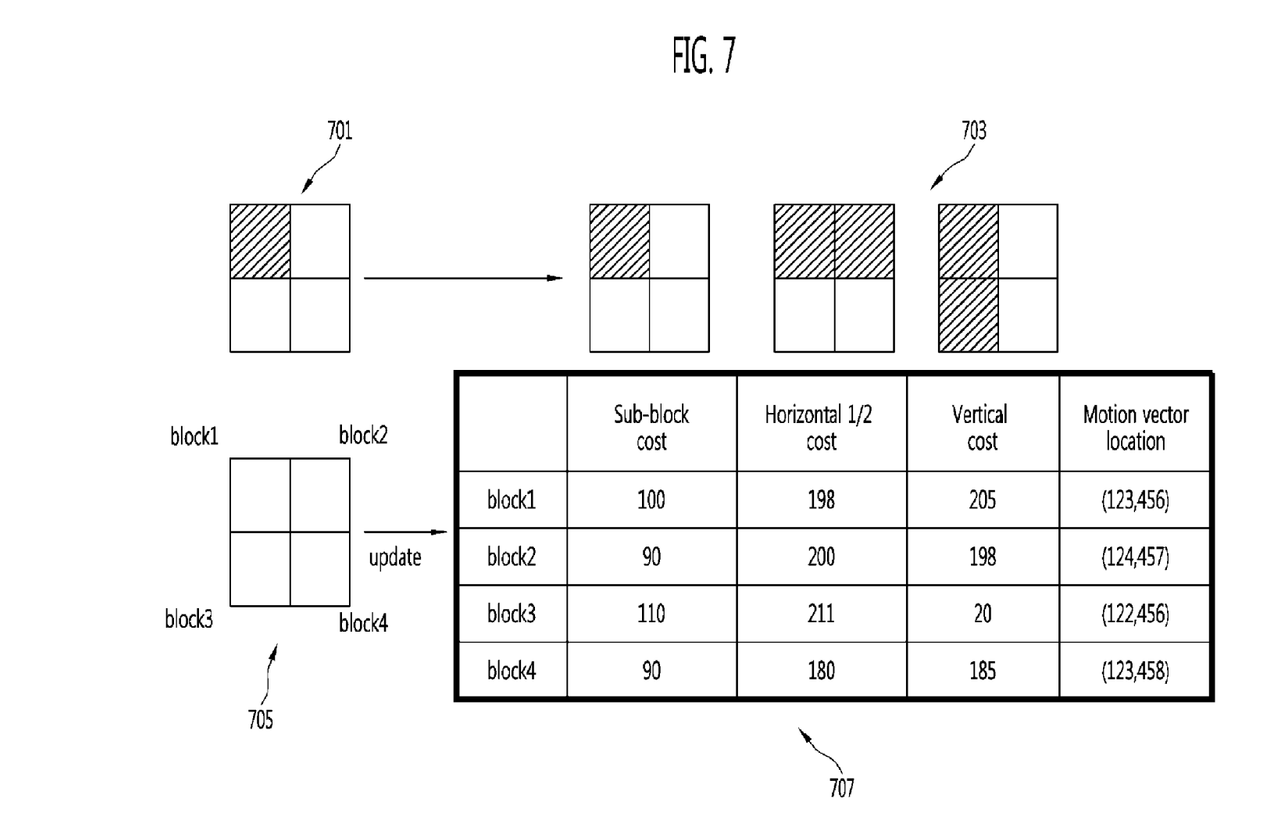
FIG. 7 shows values stored in a reference memory according to an exemplary embodiment of the present invention.

FIG. 7 shows values stored in a reference memory according to an exemplary embodiment of the present invention.

Referring to FIG. 7, with respect to a higher-level block 701 that is to be searched for block-partition, not only cost values of ¼ sub-blocks in which the higher-level block 701 is partitioned into four but also cost values of ½ blocks in which the higher-level block is vertically or horizontally partitioned into two based on the sub-block as in reference numeral 703 are computed.

Reference numeral 705 represents ¼ sub-blocks partitioned from a higher-level block. In this instance, as can be seen in a table 707, a cost of a horizontal ½ block and a cost of a vertical ½ block as well as a cost of each sub-block are computed.

The computed values can be applied when a block partition search is performed using the method of FIG. 6.

According to the present invention, a method and apparatus for partitioning a block in inter prediction can be provided.

Also, when a block is partitioned in inter prediction, the computation amount can be reduced and partitioning can be easily determined.

While the invention has been shown and described with reference to certain exemplary embodiments thereof, it will be understood by those skilled in the art that various changes in form and details may be made therein without departing from the spirit and scope of the invention as defined by the appended claims.

What is claimed is:

1. A method for a video compression device to partition a block in inter prediction of a video compression process that uses a H.264 standard, comprising:
   selecting, by a computing unit of the video compression device, one standard reference frame from a plurality of reference frames which are a comparison target in the inter prediction;
   performing, by the computing unit of the video compression device, a first block size search using the selected standard reference frame;
   determining, by the computing unit of the video compression device, a first block size of the selected standard reference frame;
   performing, by the computing unit of the video compression device, a second block size search for a second block size using another one of the plurality of reference frames; and
   comparing, by the computing unit of the video compression device, the first and second block sizes, and when the first and second block sizes are of an equal value, using the equal value as a partitioning size for a block partitioning.

2. The method of claim 1, wherein the performing a first block size search comprises:
   measuring a minimum cost of a higher-level macroblock of the current selected standard reference frame;
   measuring a minimum cost of a ½ block included in the higher-level macroblock of the selected standard reference frame; and
   comparing the minimum cost of the ½ block and the minimum cost of the higher-level macroblock, and searching the macroblock of the selected standard reference frame using the ½ block if the minimum cost of the ½ block is smaller than the minimum cost of the higher-level macroblock.

3. The method of claim 2, further comprising:
   comparing the minimum cost of the ½ block and the minimum cost of the higher-level macroblock, and
   when the minimum cost of the ½ block is larger than the minimum cost of the higher-level macroblock,
      partitioning the higher-level macroblock into four sub-blocks,
      comparing motion vector locations of the sub-blocks, and
         when four motion vector locations are adjacent to each other stopping the block partitioning;
         when two or three of the motion vector locations are adjacent to each other, searching the higher-level macroblock using the ½ block (16×8, 8×16) and the ¼ block (4×4);
      and
         when none of the motion vector locations are adjacent to each other, searching the higher-level macroblock using the ¼ block.

4. The method of claim 1, wherein the reference frames have a higher-level macroblock that is either a 16×16 macroblock or an 8×8 sub-macroblock.

5. The method of claim 1, wherein the plurality of reference frames include at most 16 frames.

6. The method of claim 4, wherein for the block partitioning a partition size of the higher-level macroblock is one of 16×8, 8×16 and 8×8 when a block size of the higher-level macroblock is 16×16, and a partition size of the higher-level macroblock is one of 8×4, 4×8 and 4×4 when a block size of the higher-level macroblock is 8×8.

7. The method of claim 1, further comprising performing the block partitioning when the first and second block sizes are of the equal value.

8. The method of claim 3, wherein each of the sub-blocks has a ¼ size of the higher-level macroblock, and the ½ block has a ½ size of the higher-level macroblock.

9. The method of claim 3, wherein each of the motion vector locations is a point of a sub-macroblock in which a cost value obtained by adding a Sum of Absolute Differences (SAD) and a motion vector value is minimum.

* * * * *